United States Patent Office.

JAMES E. MILLS, OF BROOKLYN, NEW YORK.

*Letters Patent No. 69,573, dated October 8, 1867.*

IMPROVEMENT IN THE MANUFACTURE OF CHLORIDE OF ZINC.

*The Schedule referred to in these Letters Patent and making part of the same.*

Specification of certain improvements in the Manufacture of Chloride of Zinc, invented by JAMES E. MILLS, of Brooklyn, in the county of Kings, and State of New York.

The object of my invention is to produce chloride of zinc for use in the arts at a cheaper rate than by the processes and means heretofore employed in its production.

My invention consists, first, in producing the chloride of zinc directly from such ores of zinc as contain either the oxide of zinc, carbonate of zinc, or silicate of zinc, by digesting such ores with muriatic acid at common temperatures or at a moderate heat; second, in freeing the chloride of zinc from the gelatinous silica which is formed when the said chloride is made directly from the silicate of zinc as above, by heating and evaporating the water and excess of acid, and then adding water to redissolve the chloride of zinc; third, in separating iron and manganese from the choloride of zinc made directly from the ore, when they exist in proportions injurious to the product, by drying the digested mass and heating it, with free access of air, whereby the iron and manganese are highly oxidized, and thereby made capable of being separated from the chloride of zinc.

Chloride of zinc for burettizing and other uses in the arts has been hitherto obtained by dissolving in muriatic or hydrochloric acid, metallic zinc, or decomposing by the same acid an oxide of zinc, which is a product of metallurgical operations.

I produce the chloride of zinc by applying muriatic acid directly to such ores as it will decompose, and thus avoid the expense of reducing metallic zinc or subliming the oxide from the ores. The ores which will yield their zinc directly to muriatic acid, and which are formed in sufficient quantities for working, are such as contain oxide of zinc, carbonate of zinc, or silicate of zinc. I separate the zinc from its ore, and effect its combination with the chlorine by a single process or operation, namely, by digesting the above-named ores either at common temperatures or at a moderate heat with muriatic acid. When the silicate is thus digested with the acid and decomposed, the silica takes the form of a bulky gelatinous mass, from which it is difficult to separate the solution. This difficulty is obviated by heating and evaporating the water and excess of acid till the silica loses its bulky gelatinous character, and then adding water to redissolve the chloride of zinc.

The ores above named often contain, in combination or admixture with the salts of zinc, salts of iron and manganese in proportions injurious to the chloride produced. The higher oxides of iron and manganese do not form salts with muriatic acid, which will remain in considerable proportions in solution, together with a concentrated normal solution of chloride of zinc. If, therefore, the iron and manganese are oxidized to the higher degrees of oxidation, they will separate from the solution, or not be taken up into it. To effect this oxidation I dry the digested mass and heat it, with free access of air, taking care not to raise the temperature high enough to sublime the oxide of zinc. The ore should be heated on the hearth of a reverberatory furnace, arranged as usual in metallurgical operations, when the object is to oxidize one or more of the substances heated, except that the hearth should be of soapstone, (talc,) and should have a rim about its edge, so as to form a shallow trough, in which the ore can be both digested and heated. When the iron and manganese are sufficiently oxidized, water is added to dissolve the chloride of zinc, and the solution is drawn off from the sediment. In this way, from some very impure ores a chloride is produced sufficiently pure for practical purposes.

Having thus fully described my invention, I claim—

1. Producing the chloride of zinc directly from such ores as contain either the oxide of zinc, carbonate of zinc, or silicate of zinc, by digesting such ores with muriatic acid, substantially as hereinabove set forth.

2. Freeing the chloride of zinc from the gelatinous silica which is formed therein, when the said chloride is produced from the silicate of zinc as above, by evaporating the water and excess of acid therefrom, and redissolving the chloride of zinc, substantially as described.

3. Separating the iron and manganese from the chloride of zinc, made directly from the ore, when they exist in proportions injurious to the product, by drying the digested mass, oxidizing to a high degree the iron and manganese, and redissolving and drawing off the chloride of zinc, substantially as and to the effect hereinabove specified.

JAMES E. MILLS.

Witnesses:
L. A. ROBERTS,
J. G. DENMAN.